United States Patent Office 2,729,617
Patented Jan. 3, 1956

2,729,617

PRODUCTION OF THERMOSETTING SYNTHETIC RESINS CAPABLE OF IMPARTING IMPROVED WET STRENGTH TO PAPER

John B. Davidson and Edward J. Romatowski, Toledo, Ohio, assignors to Allied Chemical & Dye Corporation, New York, N. Y., a corporation of New York No Drawing. Application April 14, 1952,
Serial No. 282,264

10 Claims. (Cl. 260—70)

The invention relates to the production of thermosetting synthetic resins that are capable of imparting improved wet strength when used in the manufacture of paper.

When used for imparting wet strength to paper, a synthetic resin is usually incorporated at the wet end of the paper making process, for example, in the beater or at the head box. A synthetic resin that is incorporated at the wet end of the paper making process must be capable of dilution without precipitation of the resin, and must have an affinity for the paper fibers so that a reasonably large proportion of the resin deposits on the paper fibers and so that an unreasonably large proportion of the resin is not lost in the waste water.

The principal object of the invention is the economical production of a modified urea-formaldehyde resin that imparts improved wet strength when used in the manufacture of paper. More specific objects and advantages are apparent from the description, which discloses and illustrates, but is not intended to limit the invention.

Methylamines are useful for the modification of urea-formaldehyde resins to be used in the manufacture of paper to impart wet strength. However, methylamine is a gas, and it has been found that it is quite difficult and inconvenient to react methylamine with formaldehyde and urea to produce a synthetic resin for use in the manufacture of paper.

In the novel method of the present invention, ammonia is reacted with formaldehyde and formic acid in aqueous solution to produce methylamines, and the resulting methylamines are reacted with urea and formaldehyde in aqueous solution to produce a synthetic resin. It has been discovered that the present method is remarkably economical and that a synthetic resin which imparts excellent wet strength to paper is produced by the reaction of formaldehyde and urea in aqueous solution with the mixture of methylamines.

A resin produced by the method of the invention is a product of the reaction of an aqueous solution of methylamines with formaldehyde and urea. A urea-formaldehyde resin must be capable of forming a 0.1 per cent aqueous solution at ordinary temperatures in order to be used at the wet end of the paper making process, because a urea-formaldehyde resin cannot be incorporated successfully at the wet end unless it is that soluble. In practice the resin must be prepared in the form of a relatively concentrated solution or in dry form, and must be dispersed and dissolved as it is added at the wet end. If the resin is not sufficiently soluble to be capable of forming a 0.1 per cent aqueous solution, the resin as it is added forms curds which cannot be readily dissolved and which cause great inconvenience by necessitating frequent cleaning of the beater and associated apparatus. The formation of curds leads to serious difficulties because in practice it is necessary to incorporate the resin under acid conditions, and under such acid conditions the curds, after depositing on the equipment, are converted to the insoluble state.

One of the important functions of the methylamines used in producing a resin embodying the invention is to impart the required solubility to the resin.

The formaldehyde employed in the preparation of thermosetting synthetic resins of the invention may be in the form of one of its polymers such as paraformaldehyde or may be used in any combination with one of its polymers. Usually an aqueous reaction medium is used, consisting of the water present in an aqueous formaldehyde solution. Although the formaldehyde used may be ordinary commercial formalin (i. e., an aqueous solution comprising approximately 37 per cent formaldehyde by weight), it is preferred that the concentration of formaldehyde in the aqueous solution used be about 45 or 50 per cent. Further dilution during the reaction is undesirable since it results in resins having decreased stability and lower solubility. Reacting at a higher solids concentration than is achieved using ordinary commercial formalin results in resins which have improved water solubility and which impart greater wet strength. The stability of resins reacted at higher solids concentrations (i. e., resins in which the formaldehyde used is in a concentration of 45 or 50 per cent in aqueous solution) can be increased by dilution of the resin after preparation.

The reaction of ammonia, formaldehyde and formic acid in aqueous solution to produce methylamines may be represented by the following equations:

$$HCHO + NH_3 \rightarrow HN=CH_2 + H_2O$$
$$HN=CH_2 + HCOOH \rightarrow CO_2 + CH_3NH_2$$
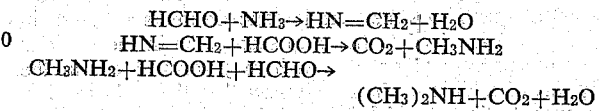
$$CH_3NH_2 + HCOOH + HCHO \rightarrow$$
$$(CH_3)_2NH + CO_2 + H_2O$$

In the production of methylamines by such a reaction the proportion of formaldehyde used may be as low as one mol per mol of ammonia, but it is preferable to use an excess of formaldehyde, e. g., at least 2 mols per mol of ammonia. Although as much as 4 mols of formaldehyde per mol of ammonia may be used, it is preferable to use not more than about 3 mols per mol of ammonia. The proportion of formic acid used in the production of methylamines is preferably at least 1 to 2 mols per mol of ammonia, and it may be as high as 4 to 6 mols per mol of ammonia. Since an excess of formaldehyde is preferably employed, some formic acid may be produced by oxidation of the formaldehyde, but any formic acid produced in this way should be in addition to the amount that is added as such within the above ranges.

The proportion of ammonia that is used in the production of methylamines may range from 0.01 to 0.3 mol per mol of the urea that is used in the reaction of the methylamines with urea and formaldehyde in the production of synthetic resins by the present method. Preferably, the proportion of ammonia is from 0.05 to 0.25 mol per mol of urea, and most desirably the proportion of ammonia is from 0.15 to 0.2 mol per mol of urea.

The proportion of water present during the reaction that forms the methylamines may be the water present in the commercially available reactants. Additional water may be used, but is not necessary or desirable. The proportion of water may be any proportion that forms a solution with the reactants.

The proportion of formaldehyde that is used to react in aqueous solution with methylamines and urea should be not more than about 2.4 mols per mol of urea and it is preferable to use not more than about 2.25 mols per mol of urea. Not less than about 1.8 mols of formaldehyde should be used per mol of urea and it is preferable to use not less than about 2.0 mols per mol of urea. It is most desirable to use about 2.1 mols of formaldehyde per mol of urea.

A synthetic resin for imparting wet strength to paper is desirably incorporated at the wet end of the paper making process before the paper is made, since this more convenient and less expensive method of applying the resin to the paper results in a wet-strengthened paper which is not coated with a sealing. This is known as "wet end addition," the term referring not only to addition in the beater but also to addition in the machine chest, head box, fan pump or any other desired point at the wet end of the paper making process. Since in the production of paper the mixture at the point of resin addition ordinarily comprises a very dilute suspension of pulp in water (less than two per cent) and a synthetic resin used for imparting wet strength is usually present in this suspension in a concentration of about one to two per cent of the pulp concentration, such a resin must be capable of dilution without precipitation. Such a resin should be a thermosetting composition so that it can be added in its water-soluble state to disperse and dissolve throughout the paper pulp suspension at the wet end of the paper making process before the paper is made, and then can be converted to a thermoset resin on the paper fibers by heating during drying or aging during storage.

The solubility in water of a urea-formaldehyde resin for use in "wet end addition" is usually represented by a typical parabolic solubility curve, plotted by determining the cloud temperature at various concentrations of resin and water. ("Cloud temperature" is that temperature above which a one phase water solution exists at a given concentration of resin.) The parabolic solubility curve of a resin for use in beater sizing must not represent too large a range of insolubility (cloud formation) at ordinary temperatures. As the resin in concentrated solution or in dry form is added to the pulp suspension in the wet end of the paper making process it may form clouds at the point of addition. It is necessary that the resin reach a concentration at which it is soluble rapidly enough so that the clouds which form at the point of addition of the resin dissolve and disperse before they have time to become curds, for curds adhere to the equipment and usually do not re-dissolve and disperse in the pulp suspension so as to permit the paper fibers to be uniformly coated. If the resin is sufficiently soluble that it is capable of forming a 0.1 per cent aqueous solution at ordinary temperatures (that is, at the practical operating temperatures ordinarily used during beater sizing, approximately 10 to 25 degrees C., varying, of course, with the location of the paper mill) the resin will pass through the concentration at which clouds form too rapidly for the clouds to become curds, and such a resin may be safely used for "wet end addition."

Ordinary urea-formaldehyde resins are far too insoluble when incorporated in the beater under the slightly acid conditions used and form curds before they have had time to be dispersed and dissolved in the water. It is necessary, therefore, to incorporate a modifying agent in a urea-formaldehyde resin which will make such a resin sufficiently soluble so that it will not form curds at ordinary temperatures as it is added to the pulp suspension in the wet end of the paper making process. In the practice of the present invention the modifying agent with which urea and formaldehyde is reacted is a mixture of methylamines in aqueous solution, comprising primarily methylamine with smaller amounts of dimethylamine and trimethylamine. Not only does a methylamine in the minimum proportions hereinafter described make the resulting condensation product capable of forming a 0.1 per cent aqueous solution at ordinary temperatures so that the resin can be used in "wet end addition," but the fact the methylamine is produced in aqueous solution, which eliminates the necessity for handling a gas, makes the production of paper treating resins by the present method both economical and convenient. A resin embodying the invention is capable of imparting high wet strength to paper more inexpensively than any urea-formaldehyde paper treating resin heretofore known.

In general, the higher the ratio of formaldehyde to urea, the lower the minimum amount of methylamines necessary to produce resins having the required solubility which impart improved wet strength to paper. As much methylamines over this minimum amount may be used as seems economically feasible for obtaining a resin with the properties desired. For a given weight of resin the wet strength increases with increasing amounts of methylamines until a maximum is reached, after which the wet strength starts to decrease. When an extremely soluble resin is desired, the amount of methylamines may be increased over that amount which gives maximum wet strength per unit of weight of resin. To obtain satisfactory wet strength with such a soluble resin it may be necessary to increase the amount of the resin used. It is preferable that a resin of the invention comprise not less than about 0.01 mol of methylamines per mol of urea. Amounts of methylamines as large as about 0.3 mol per mol of urea give a very soluble resin which imparts high wet strength more economically than urea-formaldehyde paper treating resins heretofore known, although maximum wet strength per unit of weight is obtained with a resin prepared using 0.15 to 0.25 mol of methylamines per mol of urea (with a molar formaldehyde-urea ratio of 2.12:1).

The urea and formaldehyde may be present in the solution in which the methylamines are formed. That is, ammonia, formaldehyde, formic acid and urea may all be reacted in aqueous solution in a single step (the proportion of formaldehyde being sufficient, of course, to react with both the ammonia and the urea) to produce resins of the invention. However, it is difficult to incorporate (without upsetting the preferred pH conditions for the present reaction, as hereinafter described) a sufficient amount of formic acid in a one-step procedure to obtain the proportion of methylamines required to impart the necessary solubility to the present resins. Thus, it is preferable to react ammonia with formaldehyde and formic acid in aqueous solution to produce methylamines as a separate step before reacting the methylamines so produced with urea and formaldehyde. However, very satisfactory results can be obtained by a one step procedure in which the urea and formaldehyde are present in the solution in which the methylamines are formed, if an additional modifying agent is reacted simultaneously with the urea, formaldehyde and methylamines to impart additional solubility and wet-strengthening properties to the urea-formaldehyde resin. Such a modifying agent may be a salt of a hydroxyalkylammonia hydroxide in which the only atoms other than carbon, hydrogen, quaternary nitrogen and ether oxygen atoms consist of oxygen atoms contained in hydroxyl groups and in which the total number of carbon atoms is not more than twice the sum of the number of quaternary nitrogen and ether oxygen atoms and the number of hydroxyls present in hydroxyalkyl groups. Such a hydroxyalkylammonia hydroxide may be any compound which can be considered to consist of either (a) a molecule of ammonium hydroxide in which from one to four of the hydrogen atoms connected to the quaternary nitrogen atom have been replaced with monovalent aliphatic groups at least one of which is a hydroxyalkyl group, or (b) two molecules of ammonia hydroxide in each of which from one to three hydrogen atoms have been replaced as described in (a) and which are connected by one or two divalent aliphatic groups each of which replaces one hydrogen on each nitrogen atom; any oxygen atoms other than those contained in hydroxyl groups consisting of ether oxygen atoms joining aliphatic groups connected to the same quaternary nitrogen atoms, or to two different quaternary nitrogen atoms, the total number of carbon atoms being not more than twice the sum of the number of quaternary nitrogen and ether oxygen atoms and the number of hydroxyls present in hydroxyalkyl groups.

The term "quaternary nitrogen atom" is used herein to mean a nitrogen atom which is connected to four other atoms in a group that is capable of existing as a cation. A carbon atom attached to a quaternary nitrogen atom in the hydroxyalkylammonium hydroxide may be a primary, secondary or tertiary carbon atom in a monovalent aliphatic group, or in a divalent group joining two quaternary nitrogen atoms. A hydroxyalkyl group in such compound may be any alkyl group in which at least one hydrogen is replaced by a hydroxyl group.

Hydroxyalkylammonium hydroxides, whose salts may be used in the practice of the present invention, which can be considered to be derived as described in (a) above or in (b) above, in which not more than three hydrogens on each nitrogen have been replaced, may be formed by dissolving the corresponding primary, secondary or tertiary hydroxyalkyl amine or amino compound in the aqueous reaction medium used in the practice of the present invention. Hydroxyalkylamines which may be so employed include: 2-hydroxyethylamine, bis(2-hydroxyethyl)-amine, (2-hydroxyethyl) methylamine, (2-hydroxyethyl) dimethylamine, (2-hydroxyethyl) ethylamine, 1,1-bis(hydroxymethyl) ethylamine, bis(2-hydroxyethyl) methylamine, bis(hydroxymethyl)methylamine, bis(2-hydroxyethyl) ethylene, tris(2-hydroxyethyl)amine, 1-hydroxymethylpropylamine, 1,1-bis(hydroxymethyl)propylamine, 1,1-dimethyl-2-hydroxyethylamine, 2-hydroxypropylamine, 2-hydroxybutylamine, and tris(hydroxymethyl)methylamine. Other hydroxyalkylamino compounds which may be so employed include N,N'-bis(2-hydroxyethyl)piperazine, N-2-hydroxyethylmorpholine and 2,2'-bis(2-hydroxyethylamino) diethylether. These amines and amino compounds and derivatives thereof in which hydrogen atoms connected to quaternary nitrogen atoms are replaced with alkyl or hydroxyalkyl groups (the total number of carbon atoms in the molecule should not exceed the limits hereinbefore described) can be prepared, for example, by the reaction of ethylene oxide and the corresponding amine (to form 2-hydroxyethyl substituents) or by the reaction of a nitroalkane and formaldehyde and subsequent reduction (to form hydroxymethyl substituents).

A quaternary hydroxyalkylammonium salt (e. g., tetrakis(2-hydroxyethyl)ammonium chloride) may be prepared by reacting a tertiary hydroxyalkylamine with a chlorohydroxy-alkane.

In general, when the resins of the invention are produced in a single step by the reaction in aqueous solution of urea, formaldehyde, ammonia, formic acid and a salt of a hydroxyalkylammonium hydroxide, it is preferable to use not less than about 0.01 mol of the salt of a hydroxyalkylammonium hydroxide per mol of urea, and it is desirable to use not less than about 0.045 mol of a salt of a hydroxyalkylammonium hydroxide per mol of urea. It is most desirable to use not less than about 0.05 mol of a salt of a hydroxyalkylammonium hydroxide per mol of urea. Although the proportion of a salt of a hydroxyalkylammonium hydroxide may be as high as about 0.3 mol per mol of urea, it is preferable that it be not higher than about 0.15 mol per mol of urea. The preferred proportion varies, however, in accordance with the specific hydroxyalkylammonium salt employed, particularly with the number of hydroxy groups in the hydroxyalkylammonium hydroxide molecule. When there is only one hydroxy group in the molecule of the hydroxyalkylammonium hydroxide (e. g., as in 2-hydroxyethylammonium hydroxide), the proportion of this substance required to impart sufficient solubility and wet strength is generally in the upper part of the range. As the number of hydroxy groups in a hydroxyalkylammonium hydroxide increases, the proportion of this substance required to impart sufficient solubility and wet strength tends to be in the lower part of the range. Thus, for example, when a salt of a hydroxyalkylammonium hydroxide is employed in the production of a resin of the invention and it is a salt of triethanolamine (i. e., tris(2-hydroxyethyl)amine) (such a salt is preferred in the practice of the invention), the proportion of such a salt may range from 0.01 to 0.09 mol per mol of urea. It is preferable that the proportion of a salt of triethanolamine be not less than about 0.05 mol per mol of urea and not more than about 0.075 mol per mol of urea.

The proportion of ammonia used with such proportion of a salt of a hydroxyalkylammonium hydroxide should be at least about 0.01 mol per mol of urea, and it is preferable that it be at least 0.067 mol per mol of urea. Although the proportion of ammonia may be as high as about 0.2 mol per mol of urea, it is preferable that it be not higher than about 0.15 mol per mol of urea.

It is preferable that the total proportion of the salt of a hydroxyalkylammonium hydroxide and the methylamines in a resin of the invention be at least 0.04 mol per mole of urea, since such a resin even in a highly condensed state is sufficiently soluble to be used in wet end addition and can be used to impart wet strength that is considerably higher than that imparted by a resin of the invention in which the total proportion of such modifying substances is less than 0.04 mol per mol of urea.

A hydroxyalkylammonium hydroxide may be used in addition to methylamines as a modifying agent for the present urea-formaldehyde resins even when the proportion of methylamines is sufficient to impart the required solubility to the urea-formaldehyde resins, i. e., even when the methylamines are produced in a separate step, and then are reacted in aqueous solution with urea and formaldehyde. The use of a hydroxyalkylammonium hydroxide in the resins of the invention produced by a two step procedure improves the stability of the resins.

When the present method is carried out by reacting urea and formaldehyde simultaneously with methylamines and a salt of a hydroxyalkylammonium hydroxide as a one step procedure, i. e., when the urea and formaldehyde are present in the solution in which the methylamines are formed, it is usually preferable to add the hydroxyalkylammonium hydroxide to formalin and then to adjust the pH with formic acid to about 7.0. Aqueous ammonia is then added before adding urea and heating the mixture to the reaction temperature (about 95 degrees C.). If desired, a salt of a hydroxyalkylammonium hydroxide (e. g., a hydroxyalkylammonium formate) may be added directly to the formalin, instead of forming it in situ by adjusting the pH of the mixture of hydroxyalkylammonium hydroxide in formalin with formic acid to 7.0.

When the aqueous solution of methylamines is formed separately and is then reacted with urea and formaldehyde, in the first step the formaldehyde (in an amount sufficient to react with ammonia to form methylamines, as hereinbefore described) and the formic acid preferably are mixed at room temperature, and aqueous ammonia is added slowly. The mixture is then heated at reflux until the pH is approximately neutral, i. e., within the range 7.0 to 7.4. Ordinarily, from about twenty minutes to about one hour of heating may be required to attain this pH. In the resulting neutral solution the methylamines are in the form of salts of formic acid. (In aqueous solution, the salts are methylammonium formates.) The solution of methylamines is cooled to 40 degrees C. before adding the urea and formaldehyde and heating to the reaction temperature (about 95 degrees C.) in the second step of the procedure.

In any procedure for carrying out the present reaction, when the mixture of reactants is at reaction temperature, the pH is lowered with formic acid, for the reaction must be conducted under acid conditions in order to proceed satisfactorily. The reaction pH should be between about 3 and about 6.5, and preferably it is between about 4.4 and about 6.0. When the ratio of formaldehyde to urea is high, the pH ordinarily should be in the lower portion of this range, for example 5.0 to 5.2.

The reaction temperature, in general, has little effect on the resin properties. Since at temperatures below 95 degrees C. undesirable by-products form at a pH within the range 3.0 to 6.5, it is desirable to lower the pH to within this range only after the temperature of the reaction mixture reaches about 95 degrees C., not only to increase the formation of dimethylolurea, but also to avoid turbidity in the final product. (Although formation of an insoluble by-product has no effect on wet-strengthened paper made from filtered resin, the presence of a precipitate makes colorimetric pH control during the resin preparation very difficult.) It is, therefore, most desirable that the initial pH be within a range of about 6.5 to 7.0 and that the mixture be maintained approximately in this pH range until the temperature is about 95 degrees C.

In the reaction of methylamines with urea and formaldehyde in aqueous solution, it is believed that one molecule of formaldehyde in the aqueous reaction medium combines with one molecule of water to form methylene glycol. The methylene glycol molecule condenses with a hydrogen atom attached to a nitrogen atom in the methylamine molecule (or a formic acid salt thereof, for example, monomethylamine formate or monomethylammonium formate) and with an $NH_2$ group in the urea molecule as follows:

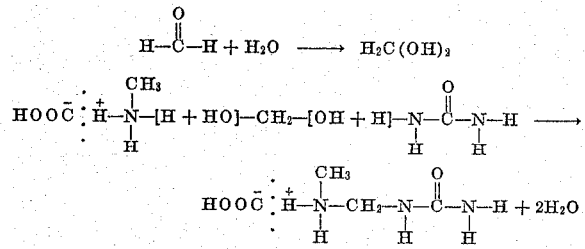

The $NH_2$ group remaining in the product condenses with additional formaldehyde and urea in the formation of complex resin molecules. It is believed that the methylamine which thus becomes part of the urea-formaldehyde resin molecule through its hydrogen atom contributes to the water solubility, and that the methylammonium ion which imparts a positive charge to the resin molecule in solution also contributes to the water solubility of the resin. It is believed that the excellent wet-strengthening properties of the resins of the present invention are due to greater retention of resins containing such a positively charged methylammonium ion (which are cationic resins) on the cellulose fibers which are reported to be negatively charged.

Although a neutralized aqueous solution of methylamines is generally considered to consist of a solution of methylamine salts, such salts are largely dissociated in aqueous solution. Thus, when the neutralized solution is reacted with urea and formaldehyde, the methylamine salts remain substantially dissociated. Then, when the product of the reaction is dehydrated, the dissociation is reversed, and the methylamine or methylammonium groups in the resinous reaction product are converted into methylammonium salt groups as the dehydration proceeds. Similarly, when a salt of a hydroxyalkylammonium hydroxide is used in the practice of the invention, the salt is largely dissociated in the aqueous reaction medium, and some of the cations produced by such dissociation combine with hydroxyl ions to form molecules of a hydroxyalkylammonium hydroxide, so that some of the molecules taking part in the reaction are molecules of the hydroxyalkylammonium hydroxide. When the product of the reaction is dehydrated the dissociation is reversed, and all the ammonium ions in the dried reaction product are converted to hydroxyalkylammonium salt groups.

When a salt of a hydroxyalkylammonium hydroxide is used in the practice of the invention, a methylene glycol molecule condenses with a molecule of the hydroxyalkylammonium hydroxide salt and with an $NH_2$ group in the urea molecule, so that the hydroxyalkylammonium hydroxide salt becomes part of the urea-formaldehyde resin molecule and contributes to the water solubility of the resin, just as methylamine salt becomes part of the urea-formaldehyde resin molecule and thus contributes to the water solubility of the resin.

In general resins of higher viscosity impart better wet-strength to paper. However, the increase in wet strength may be inappreciable beyond a certain viscosity, and since increased condensation tends to decrease both the stability and the water solubility of the resin, the reaction should be terminated when that viscosity has been reached. The viscosity of resins reacted to the same degree of condensation will, of course, differ in accordance with the solids concentration of the reaction mixture. Resins embodying the present invention in which the proportion of formaldehyde to urea is within the limits hereinbefore given, and in which the concentration of the aqueous solution of formaldehyde used is about 45 per cent, are reacted to a desirable degree of condensation by reacting at 95 degrees C. until the viscosity of the solution is "D"–"E" (measured by the Gardner-Holdt bubble viscometer standard method), cooling the solution to a temperature of 60 degrees C. and then continuing the reaction at that temperature until the viscosity of the resin solution is "M"–"N."

Using a two-stage reaction (that is, reacting first at 95 degrees C. to a certain viscosity and then reaching the final viscosity by reacting at 60 degrees C.) ordinarily makes the reaction more controllable and gives more reproducible results than a one-stage reaction carried to the same final viscosity at 95 degrees C., although there is no essential difference in the properties of the final product. Usually, the total reaction time must be at least three to four hours in order to allow sufficient time for the viscosity measurements and the temperature and pH adjustments that are necessary for safe control.

The wet-strengthening properties of a resin embodying the invention are increased when the resin is aged at room temperature or even lower temperatures for as long a period of time as the resin remains stable. It is desirable to neutralize the liquid resin with a base such as sodium hydroxide to a pH of at least 7.0 and most desirable to adjust the pH to the range 7.0 to 7.4, for greater stability of the resin.

Resins of the invention used in the present method ordinarily contain from 51 to 53 per cent solids. The stability of such resins may be further improved by diluting to a concentration of about 45 per cent solids.

The following examples illustrate the practice of the invention:

EXAMPLE 1

A resin of the invention is produced in accordance with the present method as follows:

(a) Formaldehyde (0.45 mol in an aqueous solution consisting of 51 per cent formaldehyde by weight) is held at a temperature of 30 degrees C. while formic acid (0.15 mol in an aqueous solution comprising 90 per cent by weight of formic acid) is added. Ammonia (0.15 mol in an aqueous solution comprising 28 per cent by weight of ammonia) is added slowly under vacuum. The mixture is heated to reflux and held at that temperature for approximately one-half hour until the pH is approximately 7.0 to 7.4. This mixture is then cooled to 40 degrees C. To this mixture is added formaldehyde (2.12 mols in a neutral aqueous solution comprising 51 per cent by weight of formaldehyde) and urea (1 mol). The mixture is heated to 95 degrees C. and the pH is then adjusted with dilute formic acid to 5.0 to 5.2. The heating is continued at 95 degrees C. to a viscosity of "D"–"E" (Gardner-Holdt). The mixture is then cooled to 60 degrees C. and condensed to a viscosity of "M"–"N" at that temperature. The resulting resin is neutralized with an aqueous 25 per cent sodium hydroxide solution to a pH of 7.0 to 7.4, and diluted with water to a 40 per cent solids concentration. This resin of the invention is hereinafter referred to as resin A.

(b) Formaldehyde (0.6 mol in an aqueous solution consisting of 51 per cent formaldehyde by weight) is held at a temperature of 30 degrees C. while formic acid (0.2 mol in an aqueous solution comprising 90 per cent by weight of formic acid) is added. Ammonia (0.2 mol in an aqueous solution comprising 28 per cent by weight of ammonia) is added slowly under vacuum. The mixture is heated to reflux and held at that temperature for approximately one-half hour until the pH is approximately 7.0 to 7.4. The mixture is then cooled to 40 degrees C. To this mixture is added formaldehyde (2.12 mols in a neutral aqueous solution comprising 51 per cent by weight of formaldehyde) and urea (1 mol). The mixture is heated to 95 degrees C. and pH is then adjusted with dilute formic acid to 5.0 to 5.2. The heating is continued at 95 degrees C. to a viscosity of "D"–"E" (measured by the standard Gardner-Holdt bubble viscometer method). The mixture is then cooled to 60 degrees C. and condensed to a viscosity of "M"–"N" at that temperature. The resulting resin is neutralized with an aqueous 25 per cent sodium hydroxide solution to a pH of 7.0 to 7.4 and diluted with water to a 40 per cent solids concentration. This resin of the invention is hereinafter referred to as resin B.

A beaten pulp suspension is prepared as follows, using any type of paper pulp, for example, unbleached kraft pulp.

Pulp (400 grams of unbleached kraft pulp containing the equivalent of 360 grams of oven-dried pulp) is soaked in water (10 liters) overnight. The soaked pulp is then agitated for 10 minutes with a "Lightnin" mixer (a high-speed motor-driven stirrer). The agitated suspension is then placed in a "Valley" beater (a standard beater designed for laboratory use) and enough water is added to bring the total volume of water to 23 liters (measured at a temperature of 25 degrees C.). The beater is run for five minutes (slush period) before a load (4500 grams) is placed on the lever arm which applies a force to the beater roll. Samples are withdrawn at various intervals during the beating to measure the rate at which water passes through the pulp (freeness) as Schopper freeness. The beating is terminated (after about one-half hour) when the freeness is 550 to 600. The beaten pulp is diluted to such an extent that a volume of approximately 800 ml. gives a dry sheet weighing 2.0 grams. The pH is adjusted to 6.5 by the addition of sulfuric acid. A catalyst is added at this point (3 per cent alum based on the weight of dry pulp). The beaten pulp suspension is allowed to stand for five minutes and is then ready for the addition of the resin for imparting wet strength.

A resin for imparting wet strength (one of the resin solutions prepared as described in (a) and (b) above in an amount sufficient to give 1 per cent resin, based on the weight of dry pulp) is added to the beaten pulp suspension. A volume of stock large enough to give a sheet of the desired 2.0 grams weight (800 ml.) is placed in the sheet machine and diluted to a total volume of 10.7 liters, and the pH is adjusted to 4.5 by addition of sulfuric acid. The handsheet is made within five minutes after the addition of the resin, and the operation is repeated four times without delay to make four more sheets.

The handsheets of wet-strengthened paper are made according to "Institute of Paper Chemistry—Tentative Method 411-B-Valley." The sheets are pressed separately between six blotters under a pressure of 100 pounds for two minutes. Each sheet is placed on the drier while still in contact with one blotter (sheet against the metal) and dried for five minutes at 250 degrees F.

The handsheets are conditioned for 24 hours at a temperature of 78 degrees F., and at 50 per cent relative humidity, and then are aged for one month at ordinary temperatures before being tested for wet strength.

Wet bursting strength measurements are made on the handsheets with a Mullen Tester which measures the bursting pressure, expressed as points (approximately pounds per square inch) for a standardized circular area. Bursting strength of the paper is given herein as a burst factor, that is points per 100 pounds of basis weight ("basis weight" is the weight of 500 sheets of the paper, 25 inches by 40 inches). Mullen wet burst values are obtained on paper samples wet with water from a brush (equivalent to about a ten second soak of the paper samples), and are recorded in column 2 of Table 1 (below).

Wet tensile strength measurements also are made on a standard pendulum-type tensile tester. The wet tensile strength results are given in kilograms per 15 mm. paper strip, the results being obtained after soaking for one hour in water at 23 degrees C. The results of the wet tensile strength tests are recorded in Table 1 (below) (column 3).

For sake of comparison, the wet tensile strength results obtained for each resin after full curing of the treated paper sheets on a hot plate are also included in Table 1 (column 4).

*Table 1*

| Resin | Wet Mullen | Wet Tensile (kg./15 mm.) (1 mo. aging) | Wet Tensile (kg./15 mm.) (full cure) |
|---|---|---|---|
| A | 8.9 | 1.44 | 1.49 |
| B | 8.5 | 1.37 | 1.48 |

It is evident from Table 1 that a resin of the invention such as resin A has such a rapid rate of cure that only a small increase in wet tensile strength is obtained after full cure of the treated paper, over that obtained on one month aging of the treated paper.

The resins of the invention impart wet strength that is at least as high and in many cases higher than the wet strength imparted to paper by the best urea-formaldehyde wet strength resins heretofore known. Furthermore, the cost of a resin of the invention is considerably less than that of previous resins that impart similar wet strength, i. e., paper treated with a resin of the invention has substantially greater wet strength per unit of cost than any resin-impregnated paper heretofore known.

Wet tensile strength tests are made with resins A and B (aged for one month) at concentrations of 1.0, 2.0, 4.0 and 5.0 per cent resin solids (based on the weight of air-dry pulp), the results being recorded in Table 2 (below). In these tests, the pulp is beaten and refined to a freeness of 550 to 600, and the pH is adjusted to 4.5 by the addition of alum at the regulator box.

*Table 2*

| Resin | Wet Tensile (kg./15 mm.) | | | |
|---|---|---|---|---|
|  | (.5% resin) | (1% resin) | (2% resin) | (4% resin) |
| A | 1.13 | 1.56 | 2.05 | 2.68 |
| B | 1.07 | 1.41 | 1.99 | 2.38 |

The wet strength imparted by the paper treating resins heretofore known tapers off at a resin concentration exceeding about 2½ per cent. As the results in Table 2 indicate, the resins of the invention show a continued gain in wet strength at 4 per cent concentration. Thus, in paper production in which high percentages of resin are required, e. g., in map paper production, the higher percentages of the present resins may be used without decrease in wet strength.

EXAMPLE 2

(a) A resin embodying the invention is prepared as follows: A hydroxyalkylamine (0.075 mol of tris(2-hydroxyethyl) amine) is added to methanol-free formalin (2.4 mols of formaldehyde in a solution consisting of 45 per cent formaldehyde and 55 per cent water by weight) in a 1-liter 3-necked flask fitted with a thermometer, stirring rod, reflux condenser and oil seals. Sufficient formic acid is added to adjust the pH of the mixture to 6.4. Ammonia (0.10 mol in a solution consisting of 28 per cent ammonia and 72 per cent water by weight) is then added. Urea (1 mol) is added and the mixture is heated to 95 degrees C. before addition of formic acid to lower the pH to within the range 4.6 to 4.8. The reaction is then continued at 95 degrees C. until the viscosity of the solution is "Q"–"R" (measured by the standard Gardner-Holdt bubble viscosity method). The resin solution is neutralized with dilute sodium hydroxide to a pH range of 7.0 to 7.2. Methanol (2.23 grams) is added to the mixture, which is then diluted with water to a 40 per cent solids concentration.

The wet strength imparted by this resin of the invention is as high as the wet strength imparted by the resins prepared as described in Example 1.

(b) A wet strength resin of the invention is prepared by the procedure described in (a) above except that ammonia (0.075 mol in an aqueous solution comprising 28 per cent by weight of ammonia) is used in place of the tris(2-hydroxyethyl) amine.

EXAMPLE 3

(a) A hydroxyalkylamine (0.05 mol of tris(2-hydroxyethyl)-amine) is added to methanol-free formalin (2.27 mols of formaldehyde in a solution consisting of 45 per cent formaldehyde and 55 per cent water by weight) in a 1-liter 3-necked flask fitted with a thermometer, stirring rod, reflux condenser and oil seals. Sufficient formic acid is added to adjust the pH of the mixture to 6.4. Ammonia (0.05 mol in a solution consisting of 28 per cent ammonia and 72 per cent water by weight) is then added. Urea (1 mol) is added and the mixture is heated to 95 degrees C. before addition of formic acid to lower the pH to within the range 4.6 to 4.8. The reaction is then continued at 95 degrees C. until the viscosity of the solution is "N"–"R" (measured by the standard Gardner-Holdt bubble viscosity method). The resin solution is neutralized with dilute sodium hydroxide to a pH range of 7.0 to 7.2. Methanol (2.23 grams) is added to the mixture, which is then diluted with water to a 40 per cent solids concentration.

(b) The procedure described in (a) is repeated except that the following proportions of the reactants are used and the reatcion is continued to a viscosity of "T"–"U":

|  | Mols |
|---|---|
| Urea | 1 |
| Formaldehyde | 2.42 |
| Tris(2-hydroxyethyl)amine | 0.05 |
| Ammonia | 0.10 |

(c) The procedure described in (a) is repeated except that the following proportions of the reactants are used and the reaction is continued to a viscosity of "O."

|  | Mols |
|---|---|
| Urea | 1 |
| Formaldehyde | 2.57 |
| Tris(2-hydroxyethyl)amine | 0.01 |
| Ammonia | 0.15 |

The procedures described in (a), (b) and (c) above may be repeated to prepare other thermosetting synthetic resins embodying the invention using, instead of the tris(2-hydroxyethyl)amine, an equimolar proportion of any other primary, secondary or tertiary hydroxyalkyl-substituted amine or amino compound (such as 2-hydroxyethylamine, bis(2-hydroxyethyl)amine, (2-hydroxyethyl) methylamine, (2-hydroxyethyl) dimethylamine, (2-hydroxyethyl) ethylamine, 1,1 - bis(hydroxymethyl)ethylamine, bis(2-hydroxyethyl) methylamine, bis(hydroxymethyl)methylamine, bis(2-hydroxyethyl) ethylamine, 1-hydroxymethylpropylamine, 1,1 - di(hydroxymethyl)-propylamine, 1-1-dimethyl-2-hydroxyethylamine, 2-hydroxypropylamine, 2-hydroxybutylamine, N,N'-bis(2-hydroxyethyl)-piperazine, or 2,2'-bis(2-hydroxyethylamino) diethylether).

This is a continuation-in-part of application Serial No. 226,726, filed May 16, 1951, now abandoned.

Having described the invention, we claim:

1. A method of producing a thermosetting synthetic resin capable of imparting improved wet strength to paper, that comprises reacting 1 mol of ammonia with 1 to 4 mols of formaldehyde and 1 to 6 mols of formic acid in aqueous solution to produce methylamines, and reacting from 3⅓ to 100 mols of urea per mol of ammonia and 1.8 to 2.4 mols of formaldehyde per mol of urea in aqueous solution with the methyl amines so produced at a pH between about 3.0 and about 6.5.

2. A method as claimed in claim 1 wherein at least part of the methylamines produced form salts with formic acid present in the solution.

3. A method as claimed in claim 1 wherein the urea and formaldehyde are present in the solution in which the methylamines are formed.

4. A method as claimed in claim 3 wherein the urea and formaldehyde are reacted simultaneously with the methylamines and a salt of a hydroxyalkylammonium hydroxide, the only atoms in such hydroxyalkylammonium hydroxide other than carbon, hydrogen, quaternary nitrogen and ether oxygen atoms consisting of oxygen atoms contained in hydroxyl groups, and the total number of carbon atoms being not more than twice the sum of the number of quaternary nitrogen and ether oxygen atoms and the number of hydroxyls present in hydroxyalkyl groups.

5. A method as claimed in claim 1 wherein the urea and formaldehyde are reacted simultaneously with the methylamines and a salt of a hydroxyalkylammonium hydroxide, the only atoms in such hydroxyalkylammonium hydroxide other than carbon, hydrogen, quaternary nitrogen and ether oxygen atoms consisting of oxygen atoms contained in hydroxyl groups, and the total number of carbon atoms being not more than twice the sum of the number of quaternary nitrogen and ether oxygen atoms and the number of hydroxyls present in hydroxyalkyl groups.

6. A method as claimed in claim 1 wherein the urea and formaldehyde are reacted simultaneously with the methylamines and a salt of triethanolamine.

7. A method of producing a thermosetting synthetic resin capable of imparting an improved wet strength to paper, that comprises reacting one mol of ammonia with 1 to 4 mols of formaldehyde and 1 to 6 mols of formic acid in aqueous solution to produce methylamines, and heating from 3⅓ to 100 mols of urea per mol of ammonia and from 1.8 to 2.4 mols of formaldehyde per mol of urea in aqueous solution with the methylamines so produced, at an initial pH between about 6.5 and 7.0 until the solution attains a temperature of about 95° C., and then reducing the pH to between about 3.0 and about 6.5, and maintaining said last-named pH range while the heating continues.

8. A method as claimed in claim 7 wherein the formaldehyde is provided in an aqueous solution wherein the concentration of said formaldehyde is about 45% and the heating, while the pH of the solution is maintained between about 3.0 and about 6.5, is continued until the viscosity of the solution is "D"–"E" as measured by the Gardner-Holdt bubble viscometer standard measure, cooling the solution to a temperature of 60° C., and then continuing the reaction at said last-named temperature until the viscosity of the solution is "M"–"N" as measured by the Gardner-Holdt bubble viscometer standard measure.

9. A method as claimed in claim 7 wherein the resulting resin solution is subsequently neutralized with a base to the pH range of from 7.0 to 7.4.

10. A method as claimed in claim 8 wherein the resulting resin solution is diluted to a concentration of about 45% solids.

References Cited in the file of this patent

UNITED STATES PATENTS

| | | |
|---|---|---|
| Re. 22,828 | Miller | Jan. 14, 1947 |
| 1,458,543 | Pollak | June 12, 1923 |
| 2,033,718 | Kraus | Mar. 10, 1936 |
| 2,306,697 | Hayward | Dec. 29, 1942 |
| 2,317,181 | D'Alelio | Apr. 20, 1943 |
| 2,338,464 | Smidth | Jan. 4, 1944 |
| 2,605,253 | Auten | July 29, 1952 |
| 2,626,251 | James | Jan. 20, 1953 |

FOREIGN PATENTS

| | | |
|---|---|---|
| 536,754 | Germany | Oct. 26, 1931 |
| 613,678 | Germany | May 23, 1935 |
| 169,354 | Austria | Nov. 10, 1951 |